Figure 1:
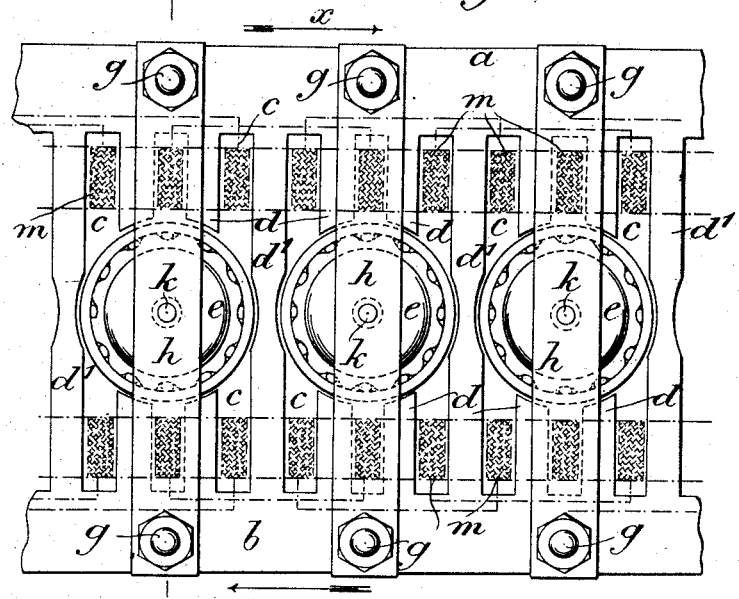

No. 881,585. PATENTED MAR. 10, 1908.
E. HOPKINSON & J. FRITH.
ELECTRIC MOTOR.
APPLICATION FILED DEC. 29, 1905.

3 SHEETS—SHEET 1.

Witnesses
W. Henry Simms
E. Clough

Inventors
E. Hopkinson
J. Frith
Attorney

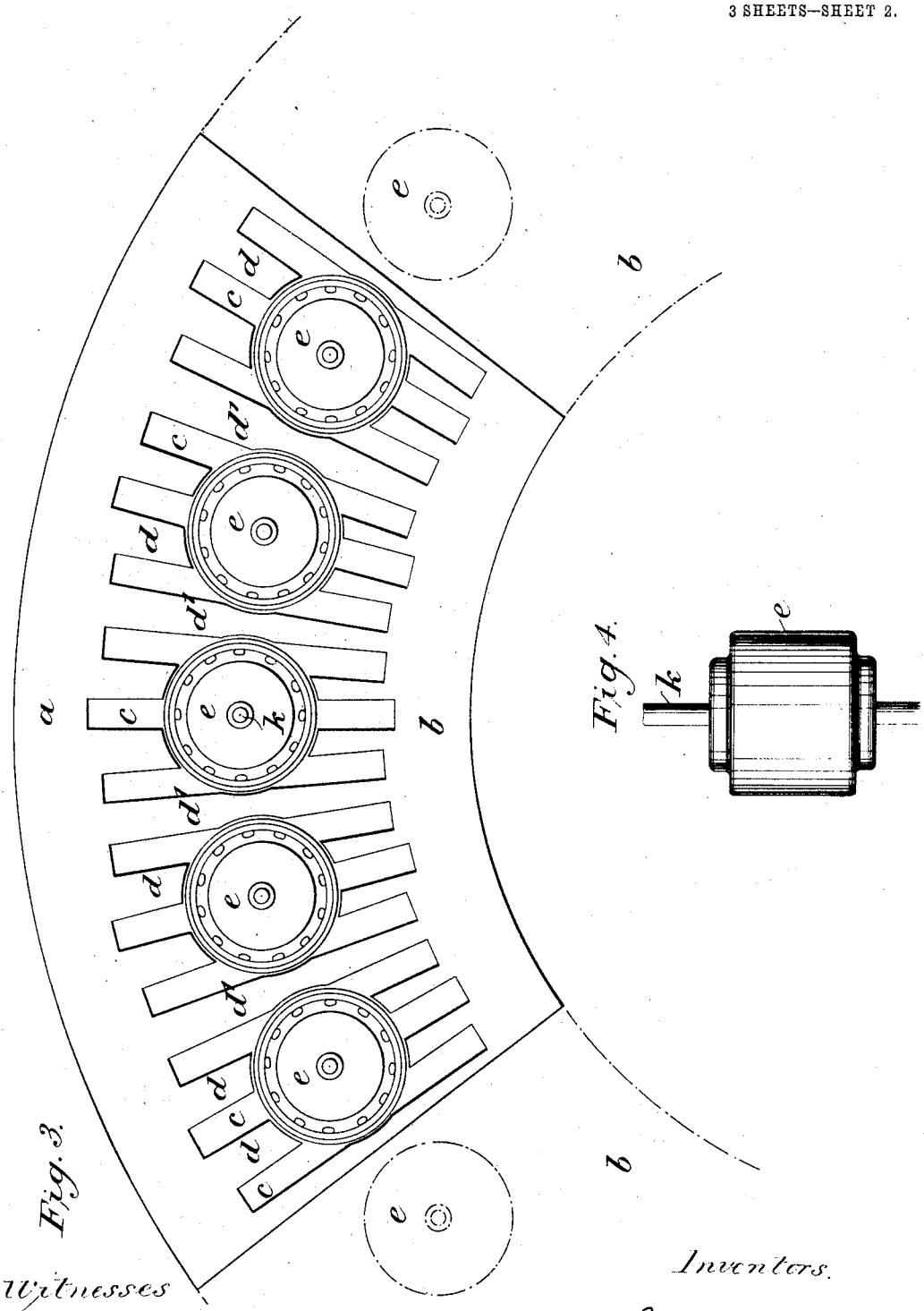

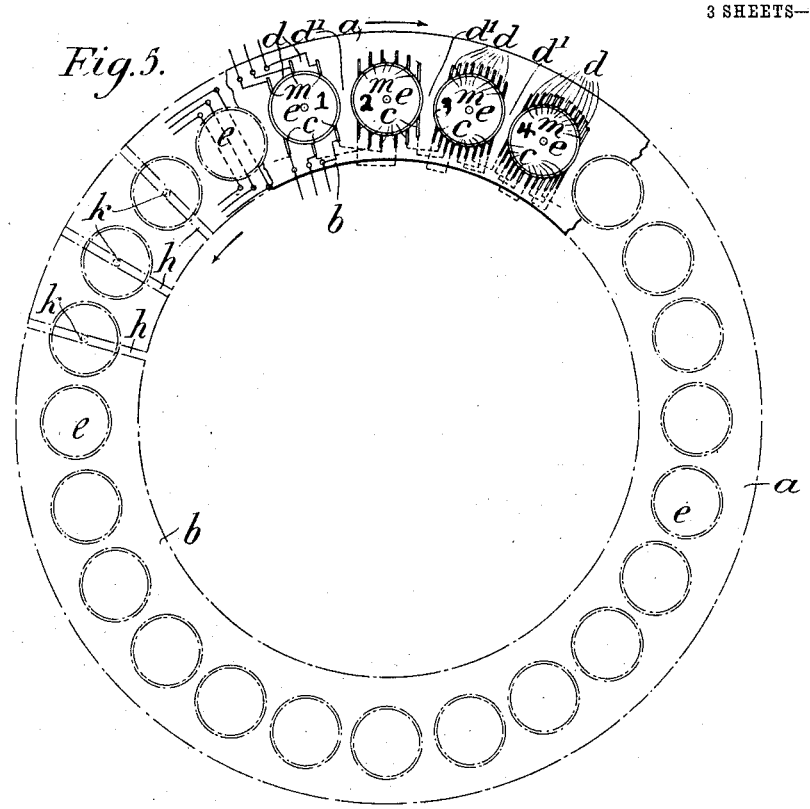
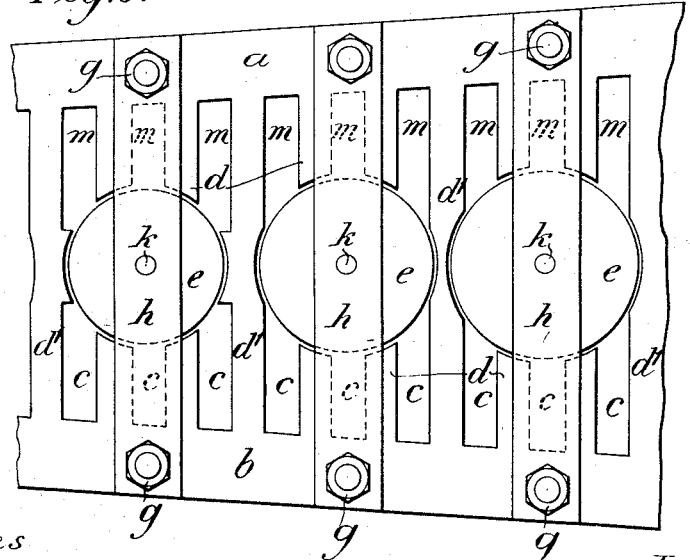

UNITED STATES PATENT OFFICE.

EDWARD HOPKINSON AND JULIUS FRITH, OF MANCHESTER, ENGLAND, ASSIGNORS TO MATHER & PLATT LIMITED, OF MANCHESTER, ENGLAND.

ELECTRIC MOTOR.

No. 881,585.　　　　Specification of Letters Patent.　　Patented March 10, 1908.

Application filed December 29, 1905. Serial No. 293,751.

*To all whom it may concern:*

Be it known that we, EDWARD HOPKINSON and JULIUS FRITH, subjects of the King of Great Britain and Ireland, residing, respectively, at Manchester, England, have invented Improvements in Electric Motors, of which the following is a specification.

This invention has reference to improvements in electric motors. An electric motor according thereto comprises a plurality of rotors and an electro-magnetic field system common to and adapted to simultaneously rotate the said rotors.

According to one construction, the electric motor is of the induction type, actuated by polyphase electric currents, and comprises a stator having two fixed and oppositely arranged parts between which are arranged a plurality of rotors that can be caused to rotate at the same speed or at different speeds. The two parts of the stator may be rectilinear, and in that case may be parallel or inclined to each other; or they may be segmental; or they may form two complete concentric circles with the rotors arranged in an annular space or row between them. It is preferred to construct the two parts of the stator, which may be mechanically connected by cross stays, from superposed stampings of iron or steel having teeth which project inwardly but are arranged to leave a space between the two stators for each rotor. Through the slots between the teeth of the superposed stampings are wound insulated conductors supplied with polyphase currents from an external source, the electrical connections being arranged in such manner that the moving magnetic field induced by the polyphase currents will progress in opposite directions in the two parts of the stator.

In the space left between the inwardly projecting teeth of the two parts of the stator, which constitute the magnetic poles, are placed a plurality of rotors, with their axles parallel or approximately so, and arranged at right angles or approximately so, to the plane of the stator and carried in suitable supports. These rotors may be solid or tubular, and may have smooth surfaces, or their surfaces may be grooved or slotted, and conductors may be placed in the grooves or slots, as heretofore usual in induction motors. Since the moving magnetic field in the part of the stator on the one side of the rotors is progressing in the reverse direction to that in the part of the stator on the other side, electric currents will be induced in the rotors between them, or in the coils thereon, which will cause the rotors to rotate at a uniform speed proportional to the frequency of the polyphase currents in the stators, since the moving field is common to all the rotors. The speed of progression of the moving magnetic field may be varied by varying the frequency of the polyphase currents in any convenient manner, whereupon the speed of rotation of the rotors will simultaneously vary in like proportion.

By a modification in the construction, according to which the pitch of the poles of the two stators, or in other words the distances from one pole to the next, is made different at different parts of the stators, the rotors placed in such different parts will be caused to rotate at different speeds, which will be in exact ratios, corresponding to the pitch of the poles.

The invention further consists in the various novel features of construction and in the combinations and arrangements of parts all as hereinafter more particularly described and pointed out in the claims.

Figure 2:
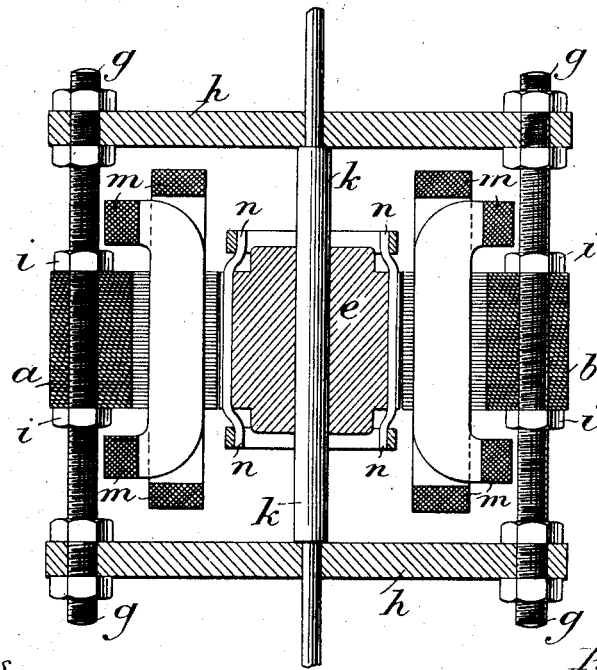

In the accompanying illustrative drawings Figure 1 shows in plan, part of an electric motor according to this invention, having a rectilinear stator. Fig. 2 is a sectional elevation on the line A A of Fig. 1. Fig. 3 shows in plan, part of an electric motor according to this invention constructed with a curved stator, the stator windings being omitted. Fig. 4 is an elevation of a single rotor but without the conductors or windings shown in Figs. 1 and 2. Figs. 5 and 6 show, diagrammatically, modified constructions.

*a* and *b* are the two oppositely arranged parts of the stator built up of superposed stampings of iron or steel formed with slots *c* and with intervening teeth *d*, constituting the poles, which project inwardly or towards each other and are made of such length as to leave spaces between them for the reception of the rotors *e*. At those places where no rotors are to be mounted, the teeth from the opposite stators may be continued and thus caused to constitute cross stays, as at $d^1$. The stampings composing the two parts of the stator may be further held together by screw threaded rods $g$ that pass through them and through cross stays $h$ and are provided with nuts $i$ between which the stampings can be tightly clamped. The cross stays $h$ may also, as shown, be utilized to carry the bearings for the axles $k$ of the rotors $e$.

Insulated conductors $m$ are wound in the ordinary way in the slots $c$ between the teeth $d$ and $d^1$ of the stator to form the stator windings which are traversed by polyphase electric currents supplied, as usual, from an external source, whereby a moving magnetic field will be induced in the stator in a manner well understood. The windings $m$ are, however, according to this invention, connected and arranged in such manner that the moving magnetic field set up in the part $a$ of the stator will progress in the opposite direction to that simultaneously set up in the part $b$ of the stator, that is to say, if the field set up in the part $a$ progress in the direction of the arrow $x$, that set up in the part $b$ will progress in the direction of the arrow $y$. For this purpose, a single set of polyphase windings $m$ may be arranged to extend in one direction along one part of the stator and then be bent round and arranged to extend backward or in the opposite direction along the other part of the stator.

The form of the stators may, as hereinbefore stated, be rectilinear, as shown in Figs. 1 and 6; or segmental, as indicated in Fig. 3; or its two parts may form two complete circles arranged concentrically one within the other, as indicated partly by the full and partly by dotted lines in Fig. 5.

The rotors $e$, which, as stated above, are mounted to rotate in the spaces left between the teeth $d$, $d^1$, may be of any of the well known forms of construction used in induction motors, and may be solid or tubular; they may also be provided with conductors wound on them, or arranged in slots formed in their periphery; and these windings may be of the so-called squirrel-cage type, or they may be provided with slip-rings, as well understood. In the examples illustrated, the rotors are each provided with a winding $n$ of the squirrel-cage type.

Since the direction of progression of the moving magnetic field in the part $a$ of the stator is opposite to that in the part $b$ of the stator, electric currents will be induced in all the rotors $e$ between them, and the rotors will thereby be caused to rotate simultaneously. If the pitch of the magnetic poles, that is to say the number of poles per rotor, be equal, as in the examples shown in Figs. 1, 2 and 3, the rotors will rotate simultaneously at a uniform speed which will be proportional to the frequency of the polyphase currents supplied to the stator windings since the moving magnetic field is common to all the rotors. The speed of progression of the moving magnetic field in the two parts of the stator may be varied by any of the well known methods, such as by altering the frequency of the polyphase currents, or by altering the connection of the windings $m$ by a suitable switch, whereupon the speed of rotation of the rotors will be simultaneously varied in like proportion.

By the modified form of construction shown in Fig. 5, according to which the pitch of the magnetic poles formed by the sets of teeth $c$ is made different at different parts of the stators $a$ and $b$, it is possible to obtain simultaneously different speeds of rotation for the rotors $e$ placed in these different parts, such different speeds being in exact ratios corresponding to the pitch of the poles. In the example shown, the two parts $a$, $b$ of the stator have two, four, six and eight poles per rotor $e$ at the positions 1, 2, 3 and 4 respectively so that the speeds of the rotors at these positions will be in the ratio of one, one half, one third and one quarter, there being three windings $m$ for a three phase current.

In the arrangements shown in Figs. 1, 3 and 5, the rotors $e$ are all of the same diameter. When the two parts $a$, $b$ of the stator are rectilinear and are inclined to one another, as shown in Fig. 6, the rotors $e$ may be made of successively larger and larger diameter from near one end of the two parts of the stator towards the other end.

It will be evident that various other changes can be made in the construction of the electric motors without departing from the spirit and scope of the invention so long as the relative arrangement of the main parts of such motors, or the mode of operation described, is retained.

An induction motor constructed as described is adapted for use in any case where it is desired to provide a motor of compact and comparatively small size for simultaneously driving two or more shafts or other devices, which are in close contiguity, at the same or at different speeds.

What we claim is:—

1. An electric motor of the induction type having a plurality of rotors mounted to revolve about separate axes, and a magnetic system common to and arranged to extend symmetrically around said rotors in a direction transverse to their axes and to act equally and simultaneously upon diametrically opposite parts of each rotor.

2. An electric motor of the induction type comprising a plurality of independent rotors mounted to revolve about separate axes displaced laterally of one another, and a stationary electro-magnetic system common to and arranged to extend symmetrically around said rotors in a direction transverse to their axes and to act inductively and equally upon diametrically opposite parts of each rotor and to simultaneously rotate all the rotors.

3. An electric motor of the induction type comprising a plurality of independent rotors mounted to rotate about separate axes, and a stationary electro-magnetic system common to said rotors and having polyphase windings arranged to produce magnetic fields that travel in reverse directions in opposite parts of said electro-magnetic system and to act inductively upon and simultaneously rotate said rotors.

4. An electric motor of the induction type comprising a plurality of rotors revoluble independently about separate axes, and a stator comprising oppositely arranged parts common to all the rotors, the rotors being arranged between the parts of the stator and the stator being provided with polyphase windings arranged so that a moving magnetic field set up in one part of the stator will be caused to progress in the reverse direction to that set up in the opposite part of the stator.

5. An electric motor of the induction type comprising a stator having two oppositely disposed parts provided with polyphase windings producing oppositely moving magnetic fields therein, and a plurality of independent rotors, revoluble about separate axes and arranged between the parts of said stator.

6. An electric motor of the induction type comprising a stator having oppositely disposed parts in which oppositely moving magnetic fields are produced, polyphase windings producing such fields, and a plurality of rotors arranged symmetrically between the parts of said stator and revoluble about axes which are independent and parallel or substantially parallel to one another.

7. An electric motor of the induction type comprising a stator having parts arranged parallel to one another and provided with polyphase windings producing oppositely moving magnetic fields, and a row of rotors arranged between the parts of said stator and independently revoluble about separate axes.

8. An electric motor of the induction type comprising a stator having oppositely arranged parts that are provided with polyphase windings and are of curved shape in the direction of their length, and a plurality of independent rotors arranged between the parts of said stator and revoluble about separate axes located in a curved line.

9. An electric motor of the induction type comprising a stator having two annular parts arranged concentrically in the same plane and provided with polyphase windings producing oppositely moving magnetic fields in the two parts, and an annular row of independent rotors located between said parts.

10. An electric motor of the induction type comprising a stator having two parts formed with a plurality of teeth arranged to form sets of magnetic poles and provided with polyphase windings producing oppositely moving magnetic fields in the two parts of said stator, and a plurality of rotors arranged between said sets of poles and independently revoluble about separate axes.

11. An electric motor of the induction type comprising a stator having a polyphase winding and sets of magnetic poles of different pitch, and a plurality of independently revoluble rotors arranged between said sets of poles.

12. An electric motor of the induction type comprising a stator having two oppositely arranged parts provided with polyphase windings and connected together at intervals, and a plurality of rotors independently revoluble located between said parts of the stator.

13. An electric motor of the induction type comprising a stator having two slotted parts arranged opposite each other in a common plane, and provided with polyphase winding, and a plurality of independent rotors arranged between said parts of the stator with their axes in separate planes at right angles to that of the stator.

14. An electric motor of the induction type comprising a stator having two slotted parts arranged in a common plane and provided with polyphase windings producing oppositely moving magnetic fields in the two parts, cross stays connecting said parts of the stator together at intervals of their length, a plurality of independent rotors arranged between said parts of the stator and cross stays, and bearings carried by said parts of the stator for said rotors.

15. An electric motor of the induction type comprising two stators built up of superposed slotted laminæ arranged to form circular sets of magnetic poles in a common plane, polyphase windings extending through the slots in said stators, cross stays integral with said laminæ and connecting said parts of the stator together at intervals of their length, and a plurality of independent rotors located between the circular sets of magnetic poles.

16. An electric motor of the induction type comprising a stator having two horizontal parts formed of plates slotted to form sets of oppositely arranged bars or teeth in a common plane, some of which extend across from one stator to the other, polyphase windings extending through the slots between said teeth so as to produce oppositely moving magnetic fields in the two parts of the stator, a plurality of independent rotors arranged between the sets of teeth with their axes vertical and parallel to one another, and upper and lower bearings, connected to the upper and lower sides of the parts of said stator, for said rotors.

Signed at Manchester, in the county palatine of Lancaster, England, this seventh day of December 1905.

EDWARD HOPKINSON.
JULIUS FRITH.

Witnesses:
ROGER E. GRIME,
GEORGE P. SIMPSON.